Dec. 9, 1969  N. T. EXTON  3,482,725

CLOSURES AND METHODS OF MAKING THE SAME

Filed Dec. 6, 1966

INVENTOR
NORMAN T. EXTON

BY  *Darby & Darby*

ATTORNEYS

United States Patent Office 3,482,725
Patented Dec. 9, 1969

3,482,725
CLOSURES AND METHODS OF
MAKING THE SAME
Norman T. Exton, Port Washington, N.Y., assignor to The
KLM Company, Bridgeport, Conn., a corporation of
Connecticut
Filed Dec. 6, 1966, Ser. No. 599,433
Int. Cl. B65d 41/04
U.S. Cl. 215—43
10 Claims

ABSTRACT OF THE DISCLOSURE

A bottle closure made of a flexible plastic material, by a vacuum or pressure forming process as contrasted to the usual injection or compression molding technique. In preferred embodiments the closure has a rim for sealing the edge of a container lip by deforming thereover.

---

The present invention is directed to a plastic closure for sealing bottles or other containers, which is very economical to make and to novel methods of making this closure. In accordance with the invention, the closure is made by relatively economical pressure or vacuum-forming operations rather than by the conventional and more expensive injection or compression molding techniques usually utilized with plastic bottle closures. Further, and also in accordance with the invention, a preferred embodiment of the closure is formed with a unique sealing rim on the interior of its upper wall which is deformable into an air space formed on the upper wall and adapted to engage and seal an edge of the lip of a bottle onto which the closure is fastened.

It is therefore an object of the present invention to provide a novel method for producing plastic bottle closures by the use of a pressure-forming or vacuum-forming technique.

It is still a further object of the invention to provide a novel one-piece plastic bottle closure made by a pressure or vacuum forming technique.

An additional object is to provide a novel plastic one-piece bottle closure having a sealing rim therein, the rim being adapted to deform and seal an edge of the lip on the neck of a container.

Still another object is to provide a one-piece plastic closure having a pair of deformable sealing rims for engaging and sealing the inner and outer edges of a container lip.

Other objects and advantages of the present invention will become more apparent upon reference to the following specification and annexed drawings, in which.

Heretofore, plastic bottle closures have been made by conventional injection or compression molding techniques which require the use of expensive molding machinery. While such closures have, in the majority of cases been satisfactory when used with a liner to seal a bottle, they are relatively expensive to make. Further one-piece closures without a liner made by prior art methods have been generally unsatisfactory since the closure material generally has been too "stiff" to form an adequate seal around the bottle lip.

Figure 1:
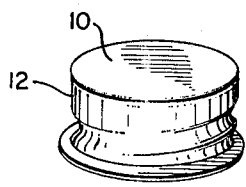
FIG. 1 is a perspective view of one form of bottle closure made in accordance with the subject invention.
Figure 1A:
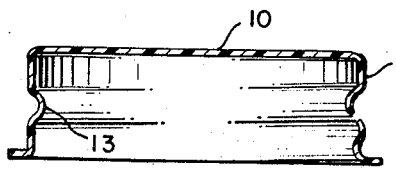
FIG. 1A is a cross-sectional view of the closure of FIG. 1.

Before describing the process by which the closures of the present invention are made, reference is made to FIGS. 1 and 1A which show a screw type closure, made in accordance with the present invention, of generally conventional shape with a top wall 10 from which depends a skirt wall 12. This skirt wall is formed with screw threads 13 to mate with the screw threads on a bottle or other container.

While screw threads are shown to fasten the closure to the container, it should be understood that a pressure or snap-fit can be used in which the closure is forced over the lip of the container. Further, as is described below, the closure of FIGS. 1 and 1A is made by pressure or vacuum forming rather than by injection or compression molding. The closure of FIGS. 1 and 1A is the simplest form of the present invention and, the material for it is preferably polypropylene having a thickness in the range from .015 to .040 inch. It has been found that such material can be easily formed into a closure by pressure or vacuum forming and provides sufficient structural rigidity to effectuate a good seal. This material also is capable of withstanding normal usage, is relatively inert chemically and will not creep excessively. Further, so-called "filled" polypropylene can be used, i.e. polypropylene which is filled with talc, fiberglass, or some other suitable material for the closure material to increase its strength. In some cases, to improve the manufacturing process by pressure or vacuum forming amounts of polyethylene and/or styrene plastic can be added to the polypropylene. Various combinations of two or more of these materials can be used. Also, any plastic can be used, either alone or in combination, which can be pressure or vacuum formed into the closure and which is compatible with the material in the container to be sealed.

Describing now the manufacturing process, the closures of the present invention are preferably made by either pressure of vacuum-forming. In vacuum forming, sheet plastic material is heated until it becomes limp and caused to slump over a mold profile, here—the closures. Vacuum, air or mechanical pressure is used to create close profile conformity. It is preferred that either a drape forming process, a vacuum snap back process, or a forced male form process be used. In the drape process the heated sheet is draped over a male form, and vacuum is employed to pull it down in contact with the surfaces of the male form. The male forms in this case are molds of the closures. In the vacuum snap-back process the heated plastic sheet is positioned over a cavity and pulled partially into the cavity by the application of vacuum within the cavity. A male plug is then moved down on top of the concave plastic sheet to a predetermined position, and the vacuum is released in the cavity to allow the stretched sheet to snap back against the male plug. Vacuum is then applied through holes in the male plug, and the formed sheet chilled. Here again, the male plugs have the shape of the closures.

In the forced male form process a male plug, descending from above by means of hydraulic pressure is forced into the heated plastic sheet secured in a frame. Partial forming to the shape of the male plug takes place. Vacuum is then applied through the holes of the male plug, causing the sheet to be pulled tightly around the plug; then the formed sheet is chilled.

In all these processes, a number of closures are made at the same time in a single mold. Because of their flexibility the finished closures even if of the screw type, can be blown off the mold by jets of air, or other fluid, forced through the plugs on the mold. Also, screw type closures can be unscrewed from the mold plugs. While a straight vacuum forming or plug and ring forming technique can be used, it is believed that the other methods described produce better closures more economically.

The closures of the present invention also can be made by air pressure forming which employs many variations to make use of excessive air pressure, above that possible in vacuum forming. In a typical case the mold is placed in an autoclave where it can be heated by placing vacuum on one side of the heated sheet and high pressure on the other, before chilling it. The heated sheet is first clamped into position above the mold cavities. Here, the cavities have the shape of the closures. A cored plug then pushes the heated sheet into the cavity and tightly seals the mold. The air pressure is introduced through holes in the plug, pushing the sheet against the sides of the female mold. Holes in the latter allow the air to escape from the underside of the sheet. The finished closures are then blown out of the cavities or taken out by any other suitable process.

In all of the processes heretofore described, the closures can be made rapidly and economically and at a cost considerably less than comparable plastic or metal closures. Further, these described processes also are used in making the closures described below.

Figure 2:
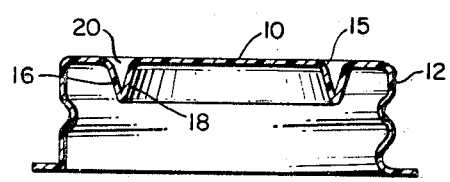
FIG. 2 is a cross-sectional view of another embodiment of closure made in accordance with the invention.
Figure 2A:
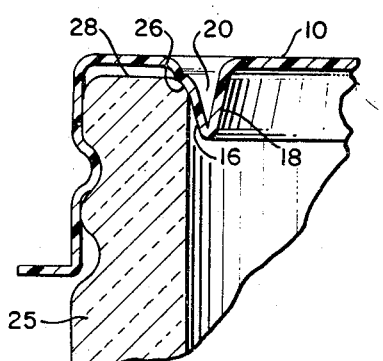
FIG. 2A is a view of the closure of FIG. 2 shown fastened onto the bottle.

FIGS. 2 and 2A show another embodiment of the closure in which a circular sealing rim 15 is integrally formed on the lower surface of the top wall 10 of the closure. The rim 15 is produced during the vacuum or pressure molding forming and is shown as having outer and inner walls 16 and 18. These walls define a groove 20, or air space, in the top wall 10 which, due to the flexibility of the closure material, permits deformation of one or both walls 16 and 18 of the sealing rim 15. As shown, it is preferred that outer wall 16 of the sealing rim which is to seal the inner edge of the bottle lip, be disposed at an obtuse angle with respect to the top wall so that it can engage the inner edge of the lip of a bottle over maximum surface area. Further, the wall 16 is preferably dimensioned with respect to the inner diameter of the bottle's sealing lip so that it engages the inner edge of the bottle lip approximately at the mid-point of outer wall 16. Of course, where the dimensions of the bottle throat vary, engagement will be at some other point on the inner wall 16. However, this does not obviate the sealing features of the rim 15.

As shown in FIG. 2A, when the closure is fastened down onto the neck of a bottle 25, the outer wall 16 contacts the inner edge 26 of the sealing lip 28. Due to its angled disposition, the inner wall 16 extends down into the throat of the bottle as the closure is screwed down until it reaches a point where it engages edge 26. At this point, further tightening of the closure causes wall 26 to deform and bend around the lip edge 26. The deformation is readily permitted by the relative thinness of the closure material, and the groove or air space 20 on the upper wall 10 into which wall 16 can move as it deforms. As should be apparent, the upper end point of inner wall 18 on wall 10 acts somewhat like a hinge permitting limited movement of the sealing rim toward the center of the closure. Thus, the action of both walls 16 and 18 and their air space 20 permit the ready deformation of wall 16 into conformity with the lip edge 26 until a complete seal is formed therearound when the closure is fully screwed down.

Figure 3:
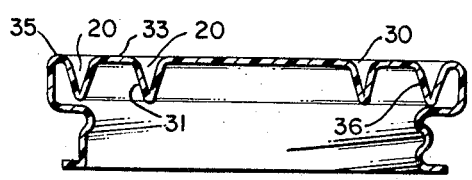
FIG. 3 is a cross-sectional view of still another embodiment of closure made in accordance with the invention.
Figure 3A:
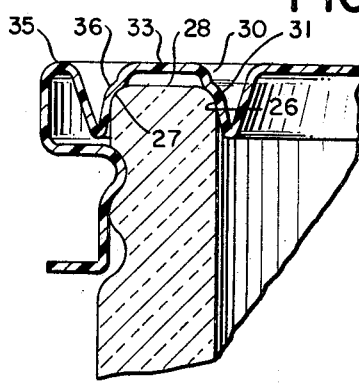
FIG. 3A is a view of the closure of FIG. 3 shown fastened onto a bottle.

FIGS. 3 and 3A show another embodiment of the invention in which two sealing rims 30 and 35 are formed on the under-surface of top wall 10. As in FIG. 2, each of the rims is formed with a pair of walls leaving an air space or groove 20 therein which, in cooperation with the flexible material of the closure permits one of the walls to readily deform to seal an edge of the bottle lip in the manner described with respect to FIGS. 2 and 2A. As shown, sealing rim 30 is used to seal the inner edge 26 of the bottle lip while rim 35 seals the outer edge 27. Here, the outer wall 31 of rim 30 contacts the inner edge 26 of the lip while the inner wall 36 of rim 35 contacts the lip's outer edge. The flat portion 33 of the closure is dimensioned to correspond to the width of the flat, or slightly rounded, upper face 28 of the bottle lip.

As shown in FIG. 3A, when the closure is fully screwed down to the neck of the bottle, the respective walls of the two sealing rims 30 and 35 deform and slightly overlay the inner and outer edges of the bottle's lip. Consequently, a double seal area is formed on the bottle. In some cases, if the closure and bottle lip are appropriately dimensioned, a third sealing area is formed on the upper face of the lip by closure portion 33. As is the case of the other closures of this invention, the closure of FIGS. 3 and 3A is preferably formed by the pressure or vacuum forming techniques described above.

Figure 5:
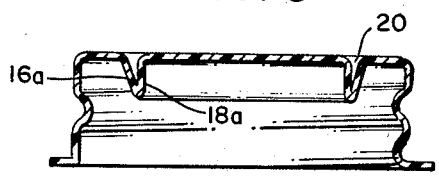
FIGS. 4 and 5 are cross-sectional views of closures showing modified forms of sealing rims.
Figure 4:
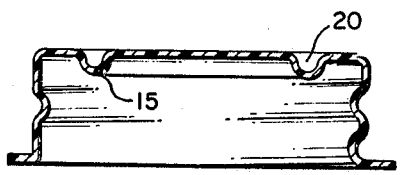

While the walls of the sealing rim 15, 30 or 35 are shown as having a generally V-shaped configuration, it should be apparent that other configurations can be utilized. For example, as shown in FIG. 4 the sealing rim can be generally U-shaped and the same deforming action will be achieved. As shown in FIG. 5 the sealing wall 16a of a sealing rim can be disposed at the obtuse angle shown previously in FIG. 2, while the non-sealing wall 18a can be disposed generally transverse to the closure top wall 10. This arrangement produces a greater sealing force since wall 18a effectively "backs-up" wall 16a and urges it against the inner edge of the bottle lip. A similar wall arrangement can be used for the closure of FIG. 3. Here, walls 31 and 35 would be disposed generally transverse to the closure top wall.

The closures of the present invention have several advantages. First of all, they are extremely economical to produce since they require only a small amount of material and relatively inexpensive molds for pressure or vacuum forming. Secondly, since polypropylene is a heat-sealable material, a skirt (not shown) can be integrally formed on the bottom of the skirt wall 12 and this heated to shrink thereby forming a shrink fit around the neck of the bottle.

While the closures heretofore described are considered as being of the one-piece type, it should be understood that appropriate sealing liners or rings may be utilized. For example, in the closure of FIGS. 1–1A, a regular circular sealing liner of either cardboard, plastic or fiber material can be snap-fit or cemented to the upper wall 10 of the closure. In the closures of FIGS. 2, 2A, 4 and 5, an annular ring disc may be used which will lie between the outer wall 16 of the sealing rim and the skirt 13 of the closure. This sealing ring would, therefore, lie primarily on the lip of the bottle. Further, in the closure of FIGS. 3 and 3A, a sealing ring can be located in the area 33 between the outer wall of sealing rim 30 and the inner wall of sealing rim 35.

What is claimed is:

1. In combination a container having a neck and a sealing lip thereon, a closure for sealing the neck of the container comprising a sheet of thermoformable, semi-rigid plastic material of originally substantially uniform thickness throughout which is formed to have a top wall and an integrally formed depending skirt wall having means thereon for fastening the closure to the container, said top wall also integrally formed with a sealing rim including a first wall which extends downwardly at an obtuse angle from the closure top wall and a second wall continuous with the first wall which extends upwardly from the lower extremity of the first wall to the closure top wall leaving an air space in the closure top wall between said first and second walls, the width of the sealing lip being greater than the distance between the skirt wall and the first wall at a point intermediate the top wall and the juncture of said first and second walls whereby said first wall engages the inner edge of the container lip and deformed thereover and into the air space to produce a seal when the closure is fastened to the container, the portion of the top wall of the closure between the skirt wall and the first wall of the sealing rim lying over the sealing lip of the container in a substantially flat condition when the closure is in the full sealing position on the container.

2. The combination of claim 1 wherein said means on said skirt wall for fastening the closure to the container comprises a screw thread which is formed from the sheet of thermoformable material during the production of the closure.

3. A closure as set forth in claim 1 wherein said second wall of the sealing rim is disposed angularly with respect to the closure top wall to form a generally V-shaped configuration with said first wall.

4. A closure as set forth in claim 1 wherein said first and second walls of the sealing rim form a generally U-shaped configuration.

5. A closure as set forth in claim 1 wherein said second wall extends generally perpendicular to the top wall.

6. A closure as in claim 1 wherein said flexible plastic material is polypropylene.

7. A closure as in claim 6 wherein said polypropylene has a thickness in the range from about .015 to about .040 inches.

8. A closure as in claim 6 wherein said flexible plastic material is "filled" polypropylene.

9. In combination a container having a neck with a sealing lip and a closure of flexible plastic material for sealing the neck of the container, said closure comprising a top wall with an integrally formed depending skirt wall for fastening the closure to the container, said top wall also integrally formed with a first and second sealing rims each of which includes a first wall which extends downwardly from the closure top wall and a second wall continuous with the first wall which extends upwardly from the lower extremity of the first wall to the closure top wall leaving an air space in the closure top wall between said first and second walls of each of said first and second sealing rim, said first wall of said first sealing rim engaging the inner edge of the container lip and deforming thereover and into the air space of said first sealing rim to produce a first seal when the closure is fastened to the container and the first wall of said second sealing rim engaging the outer edge of the container lip and deforming thereover and into the air space of the second sealing rim to produce a second seal when the closure is fastened to the container.

10. A closure as set forth in claim 9 wherein the top wall of the closure between the first walls of the two sealing rims subtsantially covers the lip of the container.

References Cited

UNITED STATES PATENTS

| | | | |
|---|---|---|---|
| 2,885,105 | 5/1959 | Heyle et al. | 215—41 |
| 3,110,411 | 12/1963 | Golde | 220—39 |
| 3,128,005 | 4/1964 | Sherlock | 220—39 |
| 3,281,000 | 10/1966 | Lowen | 215—43 |

FOREIGN PATENTS

| | | |
|---|---|---|
| 895,512 | 5/1962 | Great Britain. |

JOSEPH R. LECLAIR, Primary Examiner